US012645536B2

(12) United States Patent
Park et al.

(10) Patent No.: US 12,645,536 B2
(45) Date of Patent: Jun. 2, 2026

(54) CXL DEVICES AND OPERATION METHODS OF CXL DEVICES

(71) Applicant: Samsung Electronics Co., Ltd., Suwon-si (KR)

(72) Inventors: Changhwi Park, Suwon-si (KR); Junyoung Ko, Suwon-si (KR); Jungmin Bak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 18/330,631

(22) Filed: Jun. 7, 2023

(65) Prior Publication Data

US 2024/0168848 A1 May 23, 2024

(30) Foreign Application Priority Data

Nov. 23, 2022 (KR) ........................ 10-2022-0158459

(51) Int. Cl.
*G06F 11/00* (2006.01)
*G06F 11/10* (2006.01)
*G06F 11/30* (2006.01)

(52) U.S. Cl.
CPC ........ *G06F 11/1076* (2013.01); *G06F 11/008* (2013.01); *G06F 11/3072* (2013.01)

(58) Field of Classification Search
CPC . G06F 11/008; G06F 11/1076; G06F 11/3072
See application file for complete search history.

(56) References Cited

U.S. PATENT DOCUMENTS

| | | | |
|---|---|---|---|
| 7,047,354 B2 | 5/2006 | Yagisawa et al. | |
| 7,702,852 B2 | 4/2010 | Kawaguchi et al. | |
| 8,001,294 B2 | 8/2011 | Inoue et al. | |
| 9,256,439 B2 | 2/2016 | Takahashi | |
| 10,441,732 B2 | 10/2019 | Bruin et al. | |
| 10,476,520 B2 | 11/2019 | Arelakis et al. | |
| 2021/0065789 A1* | 3/2021 | Kowles ................. | G11C 29/50 |
| 2022/0113915 A1 | 4/2022 | Ki et al. | |
| 2022/0207193 A1 | 6/2022 | Caraccio et al. | |
| 2023/0004302 A1* | 1/2023 | Reza ..................... | G06F 3/0647 |
| 2023/0044342 A1* | 2/2023 | Wilkinson .......... | G06F 12/0882 |

(Continued)

FOREIGN PATENT DOCUMENTS

| | | |
|---|---|---|
| CN | 113360093 A | 9/2021 |
| JP | 2010073210 A | 4/2010 |

(Continued)

*Primary Examiner* — Joshua P Lottich
(74) *Attorney, Agent, or Firm* — Wolf, Greenfield & Sacks, P.C.

(57) ABSTRACT

Embodiments of the present invention provide a CXL device including a plurality of memories; a memory management unit configured to: configure at least one tier group in which the plurality of memories are classified and included; determine, based on metadata of a first memory of the plurality of memories, a grade of the first memory; and determine a tier group, to which the first memory belongs, of the at least one tier group according to the grade; and a memory processing unit configured to store data in at least one of the plurality of memories included in the at least one tier group, based on tiering information of the data.

20 Claims, 8 Drawing Sheets

(56)         References Cited

U.S. PATENT DOCUMENTS

| | | | |
|---|---|---|---|
| 2023/0092541 A1* | 3/2023 | Dugast | G06F 12/0813 |
| | | | 711/154 |
| 2023/0236933 A1* | 7/2023 | Thirumala | G06F 11/1004 |
| | | | 714/6.24 |
| 2023/0236934 A1* | 7/2023 | Yang | G06F 11/1076 |
| | | | 714/6.24 |
| 2024/0070015 A1* | 2/2024 | Del Gatto | G06F 11/1076 |
| 2024/0070065 A1* | 2/2024 | Hoang | G06F 12/0292 |
| 2024/0086328 A1* | 3/2024 | Vazhkudai | G06F 3/061 |

FOREIGN PATENT DOCUMENTS

| | | |
|---|---|---|
| KR | 20220064105 A | 5/2022 |
| WO | 2022020336 A1 | 1/2022 |

* cited by examiner

CXL DEVICES AND OPERATION METHODS OF CXL DEVICES

CROSS-REFERENCE TO RELATED APPLICATION

This application claims priority to and the benefit of Korean Patent Application No. 10-2022-0158459 filed in the Korean Intellectual Property Office on Nov. 23, 2022, the entire contents of which are incorporated herein by reference.

BACKGROUND

(a) Field

The present disclosure relates to CXL devices and operation methods of the CXL devices.

(b) Description of the Related Art

With the advancement of technologies such as artificial intelligence (AI), big data, and edge computing, computer systems may require memories with a large capacity and a high input/output speed. However, the higher the speed of the memory is, the more expensive the memory is, in addition to occupying a larger area. In order to obtain a high-capacity and high-speed memory, a memory hierarchy or system including memories of several tiers or levels may be used. A hierarchical memory system includes a plurality of levels of memories, and each level includes a memory that is slower but larger in capacity than the level of the higher tier.

Memories may have characteristics that continuously change over time, and these changes may affect reliability of the memories. Therefore, when using a hierarchical memory system, the characteristics of the memory may need to be considered.

SUMMARY

The present invention provides CXL devices having an adaptive RAID structure and operation methods of the CXL devices.

The present invention provides CXL devices that protect data and accelerate an input/output speed of data, and operation methods of the CXL devices.

Aspects of the present invention provide a CXL device including a plurality of memories; a memory management unit configured to: configure at least one tier group in which the plurality of memories are classified and included; determine, based on metadata of a first memory of the plurality of memories, a grade of the first memory; and determine a tier group, to which the first memory belongs, of the at least one tier group according to the grade; and a memory processing unit configured to store data in at least one of the plurality of memories included in the at least one tier group, based on tiering information of the data.

The memory management unit may be further configured to: determine the tier group to which the first memory belongs as a first tier group of the at least one tier group when the grade is a first grade; and determine the tier group to which the first memory belongs as a second tier group of the at least one tier group when the grade is a second grade having a reliability level lower than the first grade.

The memory management unit may be further configured to receive first data including tiering information that is set as first tier information and second data including tiering information that is set as second tier information, the memory processing unit may be further configured to: store the first data in one of the plurality of memories included in the first tier group, based on the first tier information; and store the second data in one of the plurality of memories included in the second tier group, based on the second tier information, and the first tier information may be generated based on a frequency of use and an input/output speed of the first data, and the second tier information may be generated based on a frequency of use and an input/output speed of the second data.

The CXL device may further include a compressor configured to compress the first data by using a first compression method according to a speed-focused compression algorithm when a use ratio of ones of the plurality of memories included in the first tier group exceeds a first criterion, the memory processing unit may be further configured to store the first data that was compressed in one of the plurality of memories included in the first tier group.

The compressor may be further configured to compress existing data stored in one of the plurality of memories included in the first tier group when the use ratio of the ones of the plurality of memories included in the first tier group exceeds a second criterion higher than the first criterion, and the memory processing unit may be configured to replace the existing data with the existing data that was compressed and store the existing data that was compressed in one of the plurality of memories included in the first tier group.

The compressor may be further configured to compress the second data by using a second compression method according to a compression rate-focused compression algorithm when a use ratio of ones of the plurality of memories included in the second tier group exceeds a second criterion, and the memory processing unit may be further configured to store the second data that was compressed in one of the plurality of memories included in the second tier group.

The first tier group may include a first quantity of ones of the plurality of memories having the first grade and a second quantity of ones of the plurality of memories having the second grade, the second tier group may include a third quantity of ones of the plurality of memories having the first grade and a fourth quantity of ones of the plurality of memories having the second grade, and the first quantity may be equal to or greater than the third quantity, and the second quantity may be equal to or less than the fourth quantity.

The memory management unit may be configured to set a RAID structure of each of the first tier group and the second tier group, and the memory processing unit may be configured to calculate a parity bit of the data according to the RAID structure.

The first tier group may have a RAID 0 structure and the second tier group may have a nested RAID structure.

Aspects of the present invention provide an operation method of a CXL device including determining a memory grade of each of a plurality of memories, based on metadata corresponding to each of the plurality of memories; configuring the plurality of memories such that each of the plurality of memories is included in at least one tier group in which the plurality of memories are classified, according to the memory grade; and setting a RAID structure of the at least one tier group.

The operation method of a CXL device may further include receiving data and tiering information of the data; calculating a parity of the data, according to the RAID structure of the at least one tier group, based on the tiering information; and storing the data and the parity in one of the plurality of memories included in the at least one tier group.

The operation method of a CXL device may further include determining a first tier group, in which the data is stored, of the at least one tier group, based on the tiering information; determining whether a memory use ratio of the first tier group exceeds a preset first criterion; compressing the data when the memory use ratio exceeds the first criterion; and storing the data that was compressed in one of the plurality of memories included in the first tier group.

The operation method of a CXL device may further include determining whether the memory use ratio of the first tier group exceeds a preset second criterion higher than the first criterion; and compressing existing data stored in one of the plurality of memories included in the first tier group when the memory use ratio exceeds the second criterion.

Aspects of the present invention provide a computer system including a host configured to: output first data including tiering information that is set as first tier information requiring a first number of input/output times; and output second data including tiering information that is set as second tier information requiring a second number of input/output times smaller than the first number of input/output times; and a CXL device comprising a plurality of memories and configured to: configure at least one tier group in which the plurality of memories are classified and included, the at least one tier group comprising a first tier group and a second tier group; set a RAID structure of each of the first tier group and the second tier group; store the first data in one of the plurality of memories included in the first tier group, based on the first tier information; and store the second data in one of the plurality of memories included in the second tier group, based on the second tier information.

The CXL device may be further configured to: determine a grade of a first memory of the plurality of memories, based on metadata of the first memory; determine a tier group, to which the first memory belongs, as the first tier group when the grade is a first grade; and determine the tier group, to which the first memory belongs, as the second tier group when the grade is a second grade having a reliability level lower than the first grade.

The first tier group may have a RAID 0 structure and the second tier group may have a nested RAID structure.

The CXL device may further include: a compressor configured to compress the first data by using a first compression method according to a speed-focused compression algorithm when a use ratio of ones of the plurality of memories included in the first tier group exceeds a first criterion; and a memory processing unit configured to store the first data that was compressed in one of the plurality of memories included in the first tier group.

The compressor may be further configured to compress existing data stored in one of the plurality of memories included in the first tier group when the use ratio of ones of the plurality of memories included in the first tier group exceeds a second criterion higher than the first criterion, and the memory processing unit may be further configured to replace the existing data with the existing data that was compressed and store the existing data that was compressed in one of the plurality of memories included in the first tier group.

The compressor may be further configured to compress the second data by using a second compression method according to a compression rate-focused compression algorithm when a use ratio of ones of the plurality of memories included in the second tier group exceeds a second criterion, and the memory processing unit may be further configured to store the second data that was compressed in one of the plurality of memories included in the second tier group.

The CXL device may be further configured to: calculate a parity bit of the first data according to the RAID structure of the first tier group; calculate a parity bit of the second data according to the RAID structure of the second tier group; store the first data and the parity bit of the first data in at least one of the plurality of memories included in the first tier group; and store the second data and the parity bit of the second data in at least one of the plurality of memories included in the second tier group.

DETAILED DESCRIPTION OF THE EMBODIMENTS

Figure 1:
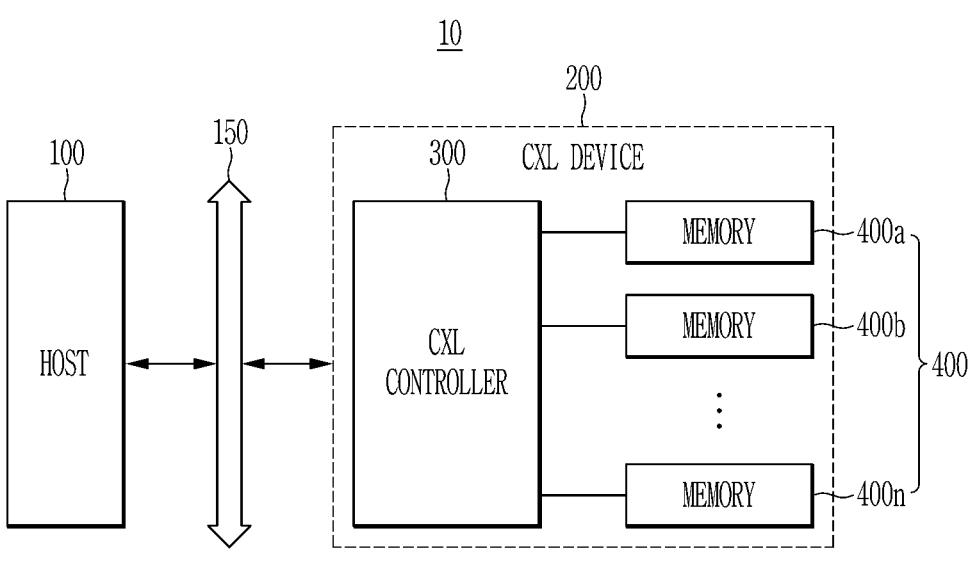
FIG. 1 is a block diagram showing a computer system according to some embodiments.

In the following detailed description, only certain embodiments of the present invention have been shown and described, simply by way of illustration. As those skilled in the art would realize, the described embodiments may be modified in various different ways, all without departing from the scope of the present invention.

Accordingly, the drawings and description are to be regarded as illustrative in nature and not restrictive. Like reference numerals designate like elements throughout the specification. In the flowchart described with reference to the drawings in this specification, the order of the operations may be changed, several operations may be merged, certain operations may be divided, and specific operations may not be performed.

In this specification, expressions described in singular can be interpreted as singular or plural unless explicit expressions such as "one" or "single" are used. In this specification, terms including ordinal numbers such as first and second may be used to describe various constituent elements, but the constituent elements are not limited by the terms. The terms may be only used to distinguish one constituent element from another constituent element.

FIG. 1 is a block diagram showing a computer system according to some embodiments.

Referring to FIG. 1, a computer system 10 may include a host 100 and a compute express link (CXL) device 200. The computer system 10 may include two or more CXL devices 200. In some embodiments, the computer system 10 may be included in a user device such as a personal computer (PC), a laptop computer, a server, a media player and a digital camera, or an automotive device such as a navigation device, a black box and an electric device for a vehicle.

Alternatively, the computer system 10 may be a mobile system such as a mobile phone, a smart phone, a tablet personal computer (PC), a wearable device, a healthcare device or an Internet of Things (IoT) device.

The host 100 may be configured to control overall operations of the computer system 10. In some embodiments, the host 100 may be one of various processors such as a Central Processing Unit (CPU), Graphics Processing Unit (GPU), Neural Processing Unit (NPU), Data Processing Unit (DPU) and the like. In some embodiments, the host 100 may include a single-core processor or a multi-core processor.

The host 100 and the CXL device 200 may be configured to communicate with each other using CXL.mem that is a memory access protocol. CXL.mem may be a memory access protocol that supports memory access. The host 100 may be configured to access memories 400a, 400b, . . . , and 400n; 400 in the CXL device 200 through CXL.mem.

The host 100 may be configured to transmit a request to the CXL device 200 through a CXL interface 150. In some embodiments, the host 100 and the CXL device 200 may be configured to share the same interface with each other. For example, the host 100 and the CXL device 200 may communicate with each other via the CXL interface 150. In some embodiments, the CXL interface 150 may be a low-latency and high-bandwidth link configured to support coherency, memory access, and dynamic protocol muxing of an IO protocol to enable various connections between accelerators, memory devices, or various electronic devices.

Hereinafter, for better understanding and ease of description, it is assumed that the host 100 and the CXL device 200 communicate with each other through the CXL interface 150. However, the scope of the present invention is not limited thereto, and the host 100 and the CXL device 200 may be configured to communicate with each other based on various computing interfaces such as a GEN-Z protocol, an NVLink protocol, a CCIX protocol, and an Open CAPI protocol.

The CXL device 200 may include individual memory devices or memory modules. In a case in which there are a plurality of CXL devices 200, each of the plurality of CXL devices 200 may be connected to the CXL interface 150 through different physical ports. That is, the plurality of CXL devices 200 are connected to the CXL interface 150, so that a memory area managed by the host 100 can be increased in capacity.

The CXL device 200 may include a CXL controller 300 and a plurality of memories 400.

The CXL controller 300 may include an intellectual property (IP) circuit designed for implementation of an application specific integrated circuit (ASIC) and/or a field-programmable gate array (FPGA). In various embodiments, the CXL controller 300 may be implemented to support a CXL protocol (for example, a CXL 2.0 protocol or any other version). The CXL controller 300 may be configured to convert CXL packets and signals of memory interfaces of the memories 400 with each other.

The CXL controller 300 may also be configured to convert data received from the host 100 and to store the converted data in the memory 400 or to convert data stored in the memory 400 and to transmit the converted data to the host 100.

The memory 400 may include one of a dynamic random access memory (DRAM), a not-AND (NAND) flash, a high bandwidth memory (HBM), a hybrid memory cube (HMC), a dual in-line memory module (DIMM), an Optane DIMM, a non-volatile DIMM (NVMDIMM), a double data rate synchronous DRAM (DDR SDRAM) and a low-power double data rate synchronous dynamic random access memory (LPDDR SDRAM), or a combination thereof.

The plurality of memories 400a, 400b, . . . , and 400n may be configured in a redundant array of independent disks (RAID) structure. In some embodiments, the RAID structure may include a single RAID structure and a tiered RAID structure.

A single RAID structure may consist of one RAID group. As will be described later, a RAID group may be a group for calculating one parity bit.

A tiered RAID structure may refer to an upper RAID structure including a plurality of lower RAID structures. In this case, one lower RAID structure may be one RAID group.

Some of the plurality of memories 400 may configure one RAID structure. The memory 400 configured with one RAID structure may operate as one memory as a whole.

Figure 2:
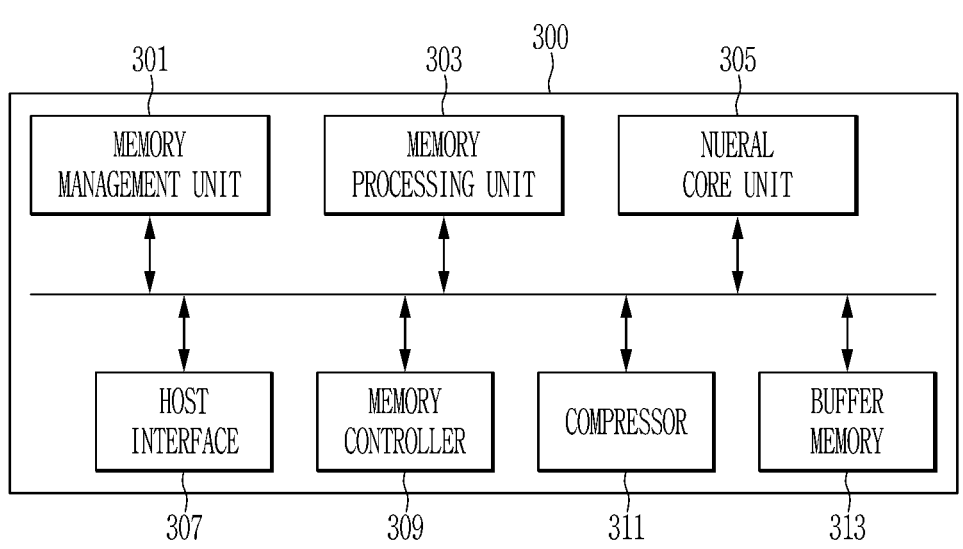
FIG. 2 is a block diagram showing a configuration of a CXL controller according to some embodiments.

FIG. 2 is a block diagram showing a configuration of a CXL controller according to some embodiments.

The CXL controller 300 may include a memory management unit 301, a memory processing unit 303, a neural core unit 305, a host interface 307, a memory controller 309, a compressor 311, and a buffer memory 313.

The memory management unit 301 may be configured to set an appropriate RAID structure according to detailed characteristics (for example, a refresh speed of a memory) of each of the plurality of memories 400. For example, the memory management unit 301 may be configured to configure the plurality of memories 400 in a single RAID structure or in a tiered RAID structure according to detailed characteristics of each of the plurality of memories 400.

In some embodiments, some of the plurality of memories 400 may be configured in at least one single RAID structure, and some of the plurality of memories 400 may be configured in at least one tiered RAID structure. In some embodiments, the plurality of memories 400 may be configured in at least one single RAID structure. In some embodiments, the plurality of memories 400 may be configured in at least one tiered RAID structure.

In some embodiments, the memory management unit 301 may be configured to set the plurality of memories 400 in a RAID 0 structure for increasing an input/output speed of data. A RAID 0 structure may be a structure in which data is striped and stored so that the plurality of memories 400 operate in parallel. The RAID 0 structure may be typically used for non-critical data, i.e., data that changes infrequently and is backed up regularly, and may be used where high speed and low cost are more important than reliability. By using the RAID 0 structure, the CXL device 200 can enable data input/output faster than the input/output speed of each of the plurality of memories 400.

In some embodiments, the memory management unit 301 may be configured to set the plurality of memories 400 in a nested RAID structure that provides an additional tier for data protection along with the RAID 0 structure. For example, the memory management unit 301 may combine features of the RAID 0 structure together with features of a RAID level for providing fault tolerance such as RAID 2 or RAID 5, into a nested configuration. In this case, the RAID structure may be referred to as RAID 50. A RAID 5 structure can use parity blocks for all memories included in a RAID 5 group. The RAID 5 structure may have good performance, good fault tolerance, and high capacity storage efficiency. For example, RAID 5 structure strips data and distributes and stores the data in a plurality of disks, while also storing parity bits used to recover data stored on the corresponding disk when a disk fails. Parity may be generated by performing an XOR operation on the striped data.

As another example, the memory management unit 301 may be configured to set the plurality of memories 400 in a data tier structure such as RAID 20, in which RAID 0 and RAID 2 structures are combined. The RAID 2 structure uses a striping method, similarly to the RAID 0 structure, but may use Hamming Code so as to check and correct a data error.

Meanwhile, the present invention is not limited thereto, and the memory management unit 301 may also be configured to use any one of RAID 0, RAID 1, RAID 2, RAID 3, RAID 4, RAID 5, and RAID 6 or any RAID structure in which at least two of the RAID structures are combined.

Furthermore, the memory management unit 301 may be configured to set the number of memories included in each RAID level.

The memory management unit 301 may be configured to configure the plurality of memories 400 in at least one tier group. Specifically, the memory management unit 301 may be configured to configure at least one tier group in which the plurality of memories 400 are classified and included. The memory management unit 301 may be configured to designate each of the memories 400 as a configuration of a corresponding tier group. In some embodiments, the memory management unit 301 may be configured to classify and divide the plurality of memories 400 into tier groups, based on software use purposes of each of the plurality of memories 400. For example, the memory management unit 301 may divide the memories into an upper tier group for storing data with a large number of input/output times and a lower tier group for storing data with a small number of inputs/output times. The memory management unit 301 may include two or more tier groups, and the number of tier groups may be set in advance.

The memory management unit 301 may be configured to determine a grade of each memory 400, based on metadata of each memory 400. The grade may indicate a reliability level of a memory. The number of grades may be set in advance. For example, the memory management unit 301 may set that a memory has five grades. In this case, the memory management unit 301 may determine that the memory has a memory grade that is one of a first grade, a second grade, a third grade, a fourth grade, and a fifth grade. The first grade indicates the highest reliability level, the second grade indicates a reliability level lower than the first grade, the third grade indicates a reliability level lower than the second grade, the fourth grade indicates a reliability level lower than the third grade, and the fifth grade indicates the lowest reliability level. That is, the reliability level may be sequentially lowered from the first level to the fifth level.

Metadata may include data representing reliability information relating to the memory 400. For example, in a case in which the memory 400 is a refurbish memory, a ratio of a use period to a warranty period of the memory 400 may be included in metadata. As another example, the memory 400 may store the number of repairs, the number of self-verifications, and the like as metadata. In addition, in the case in which the memory 400 is a refurbish memory, a remaining lifetime of the memory 400 calculated based on the production year and month of the memory 400 and the refurbishment collection year and month may be included in metadata. As another example, the memory 400 may calculate the remaining lifetime of the memory 400, based on an operating time, the number of received commands, and the like, and store the calculated remaining lifetime as metadata. As another example, the memory 400 may calculate the remaining lifetime of the memory 400, based on the warranty period and the use period, and store the calculated remaining lifetime as metadata.

The memory management unit 301 may be configured to assign a high grade to the memory 400 when the reliability of the memory 400 is high (for example, when the remaining lifetime is equal to or greater than a predetermined criterion). The memory management unit 301 may be configured to assign a low grade to the memory 400 when the reliability of the memory 400 is low (for example, when the remaining lifetime is equal to or less than a predetermined criterion).

In some embodiments, the memory management unit 301 may be configured to designate a tier group in which each memory 400 is included, according to each grade of the memory 400. For example, the memory management unit 301 may designate such that a high-grade memory is included in an upper tier group. The memory management unit 301 may designate such that a low-grade memory is included in a lower tier group. In other words, an upper tier group may include many high-grade memories, and a lower tier group may include many low-grade memories.

As described above, since the memory management unit 301 determines the grade of each memory 400, based on the metadata of each memory 400, the grade of the memory may decrease when the remaining lifetime decreases or the reliability is lowered. Accordingly, even a memory designated to be included in an upper tier group by the memory management unit 301 may be designated to be included in a lower tier group after a lapse of time. In some embodiments, the memory management unit 301 may be configured to designate such that a memory with a too low grade is not included in a tier group in the CXL device 200. In this case, the low-grade memory (e.g., a memory with too low of a grade) may not be used during an operation of the CXL device 200.

The memory management unit 301 may be configured to group each of the plurality of memories 400 so as to correspond to the level of the RAID structure, based on the grade of each of the plurality of memories 400.

In some embodiments, the plurality of memories 400 included in each tier group may have an individual RAID structure. For example, a RAID structure of the plurality of memories 400 included in an upper tier group may be different from a RAID structure of the plurality of memories 400 included in a lower tier group. In some embodiments, the memory management unit 301 may be configured to set such that an upper tier group has a RAID 0 structure and a lower tier group has a RAID 50 structure.

The memory processing unit 303 may be configured to store data received from an outside (e.g., received from an external source) in the memory 400. Specifically, the memory processing unit 303 may be configured to store data in the memory 400 included in a tier group corresponding to tiering information of the data, based on the tiering information of the data. That is, the memory processing unit 303 may provide a function of distributing and storing data in a plurality of memories 400.

The tiering information may be information that is used to determine in which tier group data is included among a plurality of tier groups in the CXL device 200. For example, the tiering information may be set in advance based on frequency of use of data, input/output speed of data, and the like. Data that is frequently used and requires a high input/output speed may be warm data. For example, the warm data may be machine learning data. In the case of warm data, the tiering information of the data may be set as upper tier information. In addition, data that is less frequently used and requires a slow input/output speed may be cold data. In the case of cold data, the tiering information of the data may be set as lower tier information. Further, data that is rarely used may be super cold data. That is, the memory processing unit 303 may be configured to manage an overall lifetime of a memory by storing warm data having a large number of input/output times in a high-grade memory.

Meanwhile, data that is highly frequently used in an operation of the computer system 10 may be hot data. In the case of hot data, tiering information of the data may not include any tier information or may be set as tier information indicating a separate memory. The hot data consumes too many memory resources due to frequent data input/output. Therefore, in the case of hot data, the memory processing unit 303 may store data in a separate memory that is not divided into tier groups.

In some embodiments, the memory processing unit 303 may be configured to generate parity bits of memories set as one RAID group according to a set RAID structure. Specifically, the memory processing unit 303 may be configured to calculate a parity bit of data, according to a RAID structure of a tier group determined based on tiering information of data. The memory processing unit 303 may be configured to store data and a parity bit of the data together in a memory in a corresponding tier group. At least a portion of each of the plurality of memories 400 may be allocated as a parity storage area, and the memory processing unit 303 may be configured to store the calculated parity bit in the parity storage area.

In some embodiments, the memory processing unit 303 may have a multi-core structure. For example, the memory processing unit 303 has a multi-core structure, and therefore, can perform parity calculation for each of the plurality of memories 400 in parallel. For example, in the case of using a RAID 50 structure, when one RAID 0 group includes N RAID 5 groups, the memory processing unit 303 may have to process at least N parity calculations at the same time so as to store data in one RAID 0 group. Therefore, the memory processing unit 303 may include multiple cores for parity calculation.

Thereafter, the memory processing unit 303 may detect occurrence of an error in data in the memory 400 by using the parity, and correct the data.

The neural core unit 305 may be configured to process data necessary for the memory 400 to perform machine learning. In some embodiments, when data received from the host 100 is machine learning-related data, the neural core unit 305 may perform calculation included in a neural network.

The host interface 307 may provide an interface function between the CXL device 200 and the host 100. The CXL device 200 may be configured to communicate with the host 100 via the host interface 307 and the CXL interface 150.

The memory controller 309 may be configured to control an access operation of the memory 400 under control of the memory processing unit 303. The access operation of the memory 400 may include, for example, read, write, and delete (e.g., erase) operations.

In some embodiments, the memory processing unit 303 may be configured to receive data and tiering information of the data from the host 100, to generate a parity bit, based on a RAID structure of the CXL device 200, and to control the memory controller 309 to write the data and the generated parity bit to the memory 400.

The compressor 311 may be configured to perform an operation of reducing a size of data by performing a compression operation on data received from the host 100 and data stored in the memory 400. The data compressed by the compressor 311 may be stored in the memory 400 via the buffer memory 313. The compressor 311 may be configured to compress data by using different compression methods, according to tiering information of data. In some embodiments, when data includes tiering information indicative of an upper tier, the compressor 311 may use a speed-focused compression algorithm (for example, Lempel-Ziv Oberhumer (LZO) method) to compress data. The LZO method divides data into blocks and compresses or decompresses data block by block in real time.

In some embodiments, when data includes tiering information indicative of a lower tier, the compressor 311 may use a compression rate-focused compression algorithm (for example, deflate method) to compress data. The deflate method is a method of encoding data by using Huffman code, which is a variable length code. Specifically, the deflate method may encode frequently used symbols in data by using fewer bits, and encode less frequently used symbols by using more bits.

Meanwhile, the present invention is not limited thereto, and the compressor 311 according to some embodiments may be configured to compress data by using any lossless compression method. For example, the compressor 311 may compress data by applying any suitable compression method such as run-length encoding (RLE), which is a pre-algorithm method, byte pair encoding (BPE), Lempel-Ziv (LZ77/78, LZSS, LZW, LZWL, LZO, LZMA, LZX, LZRW, LZJB, LZT, ROLZ) method, a context tree weighting (CTW) method, a Burrows-Wheeler transform (BWT) method and a delta method.

The buffer memory 313 may be used to temporarily store data when storing data in the memory 400 or reading data from the memory 400. The buffer memory 313 may also be used to temporarily store data when the compressor 311 compresses data read from the memory 400 or compresses data received from the host 100. The buffer memory 313 may be implemented by, for example, a volatile memory such as SRAM or DRAM.

Figure 3:
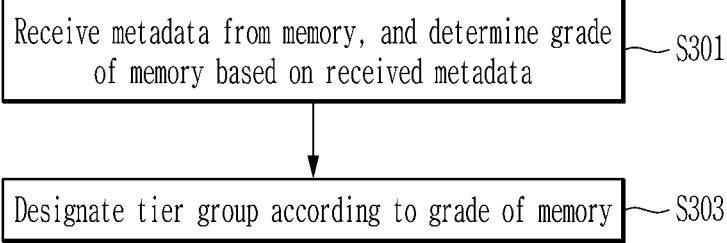
FIG. 3 is a flowchart showing a method of designating a tier group according to some embodiments.
Figure 4:
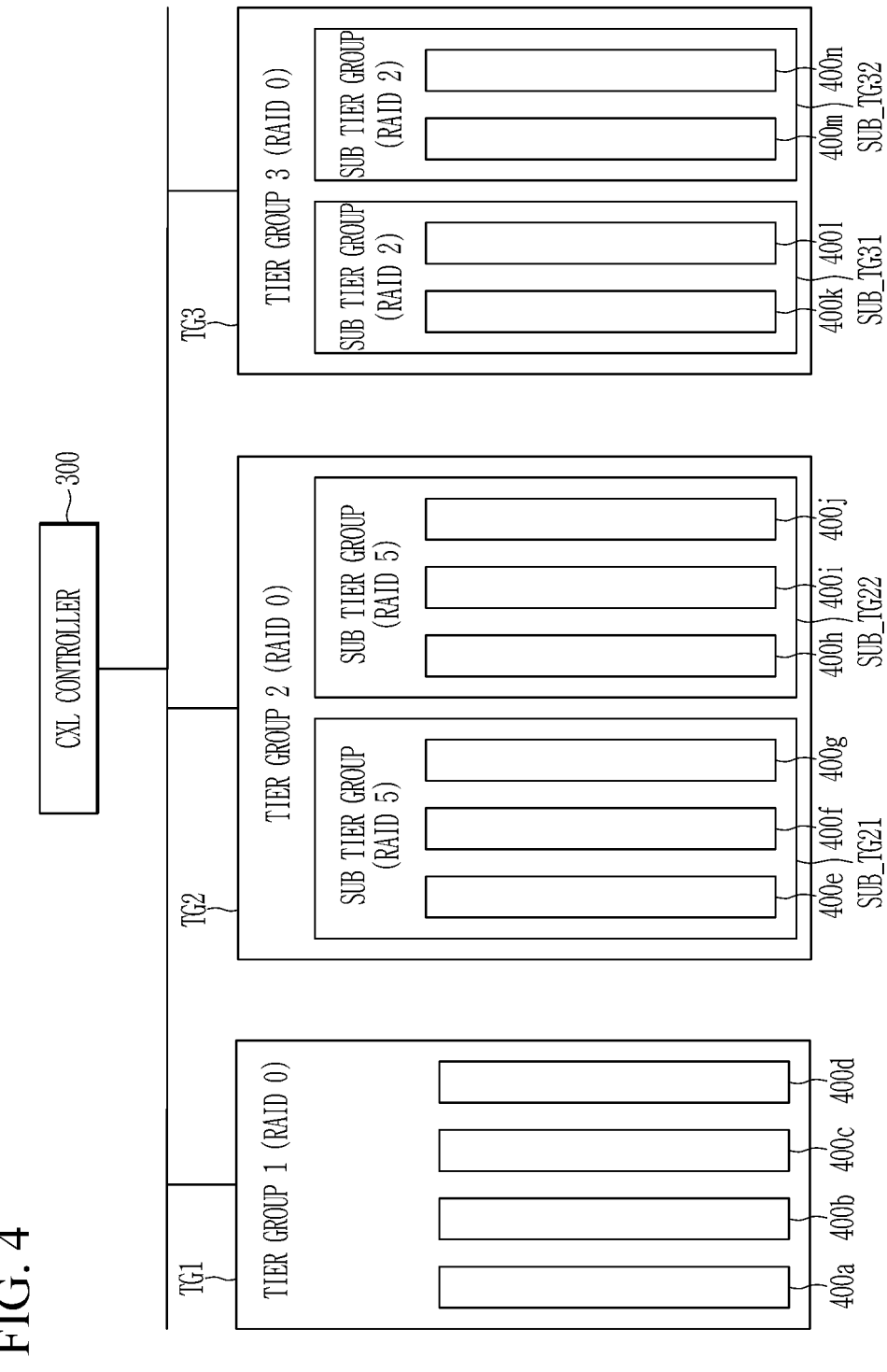
FIG. 4 is a diagram showing a structure of a memory in a CXL device according to some embodiments.

FIG. 3 is a flowchart showing a method of designating a tier group according to some embodiments, and FIG. 4 is a diagram showing a structure of a memory in a CXL device according to some embodiments.

Referring to FIG. 3, the CXL controller 300 may receive metadata from a memory and determine a grade of the memory, based on the received metadata (S301).

The metadata may include data indicative of reliability information. The CXL controller 300 may determine a grade of a memory with higher reliability as a higher grade (i.e., first grade), and determine a grade of a memory with lower reliability as a lower grade (i.e., fifth grade).

Referring to FIGS. 3 and 4, the CXL controller 300 may receive metadata about the plurality of memories 400a, 400b, . . . , and 400n in the CXL device 200.

In some embodiments, when metadata including information indicating that 10% of the warranty period has elapsed is received, the CXL controller 300 may determine a grade of a corresponding memory as the second grade. In some embodiments, when metadata including information indicating that a certain memory has never been used is received, the CXL controller 300 may determine a grade of the corresponding memory as a first grade. In some embodiments, when metadata including information indicating that 60% of the warranty period has elapsed and the number of repairs is one is received, the CXL controller 300 may determine a grade of a corresponding memory as the third grade. In some embodiments, when metadata including information indicating that repair is impossible is received, the CXL controller 300 may determine a grade of a corresponding memory as the fourth grade. In some embodiments, when metadata including information indicating that 150% of the warranty period has elapsed is received, the CXL controller 300 may determine a grade of a corresponding memory as the fifth grade. In addition, the CXL controller 300 may determine the grade of each memory, based on the received metadata.

The CXL controller 300 may designate a tier group according to the grade of the memory (S303).

The CXL controller 300 may designate such that a high-grade memory is included in an upper tier group. In addition, the CXL controller 300 may designate such that a low-grade memory is included in a lower tier group.

As shown in FIG. 4, the CXL controller 300 may set such that the CXL device 200 has three tier groups. The CXL device 200 may include a first tier group TG1, a second tier group TG2, and a third tier group TG3.

The first tier group TG1 may be a group for storing data that requires a high input/output speed and has a large number of input/output times. Accordingly, the CXL controller 300 may set such that the first tier group TG1 has a RAID 0 structure.

The first tier group TG1 may include a plurality of memories 400*a*, 400*b*, 400*c* and 400*d*. Each of the plurality of memories 400*a*, 400*b*, 400*c* and 400*d* may be a first-grade or second-grade memory. However, it is not necessary that all of the plurality of memories 400*a*, 400*b*, 400*c*, and 400*d* be high-grade memories, and a ratio of high-grade memories to the memories included in the first tier group TG1 may be higher than those of the second tier group TG2 and the third tier group TG3. For example, a case is assumed in which the first tier group TG1 includes a first quantity of first-grade memories and a second quantity of second-grade memories and the second tier group TG2 includes a third quantity of first-grade memories and a fourth quantity of second-grade memories. In this case, the first quantity may be equal to or greater than the third quantity, and the second quantity may be equal to or less than the fourth quantity.

The data input/output speed of the second tier group TG2 may be slower than the data input/output speed of the first tier group. However, the second tier group TG2 may be configured in a tiered RAID structure that is a combination of a RAID 5 structure as a lower RAID structure and a RAID 0 structure as an upper RAID structure, so as to protect data. The CXL controller 300 may set such that the second tier group TG2 has a RAID 50 structure.

The second tier group TG2 may include a plurality of sub-tier groups SUB_TG21 and SUB_TG22. The sub-tier groups SUB_TG21 and SUB_TG22 may be configured in a RAID 5 structure. The first sub-tier group SUB_TG21 may include a plurality of memories 400*e*, 400*f* and 400*g*. The second sub-tier group SUB_TG22 may include a plurality of memories 400*h*, 400*i* and 400*j*. Each of the plurality of memories 400*e*, 400*f*, 400*g*, 400*h*, 400*i* and 400*j* may be a second-grade or third-grade memory.

The third tier group TG3 may be configured in a structure for data stability more than the second tier group TG2. Accordingly, the CXL controller 300 may configure the third tier group TG3 in a tiered RAID structure (i.e., RAID 20 structure) that is a combination of a RAID 2 structure as a lower RAID structure and a RAID 0 structure as an upper RAID structure.

The third tier group TG3 may include a plurality of sub-tier groups SUB_TG31 and SUB_TG32. The first sub-tier group SUB_TG31 may include a plurality of memories

400*k* and 400*l*. The second sub-tier group SUB_TG32 may include a plurality of memories 400*m* and 400*n*. Each of the plurality of memories 400*k*, 400*l*, 400*m* and 400*n* may be a fourth-grade or fifth-grade memory.

Meanwhile, in FIG. 4, the CXL device 200 consisting of three tier groups has been described as an example. However, the present invention is not limited thereto and the CXL device 200 may consist of two or more tier groups. In FIG. 4, it is shown that the second tier group TG2 includes two sub-tier groups SUB_TG21 and SUB_TG22 and the third tier group TG3 includes two sub-tier groups SUB_TG31 and SUB_TG32. However, the present invention is not limited thereto, and the second tier group TG2 and the third tier group TG3 may include two or more sub-tier groups.

Figure 5:
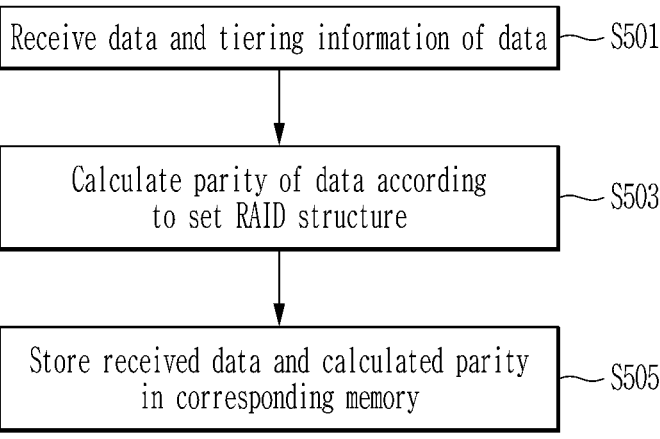
FIG. 5 is a flowchart showing a method of storing data in a memory according to some embodiments.
Figure 6:
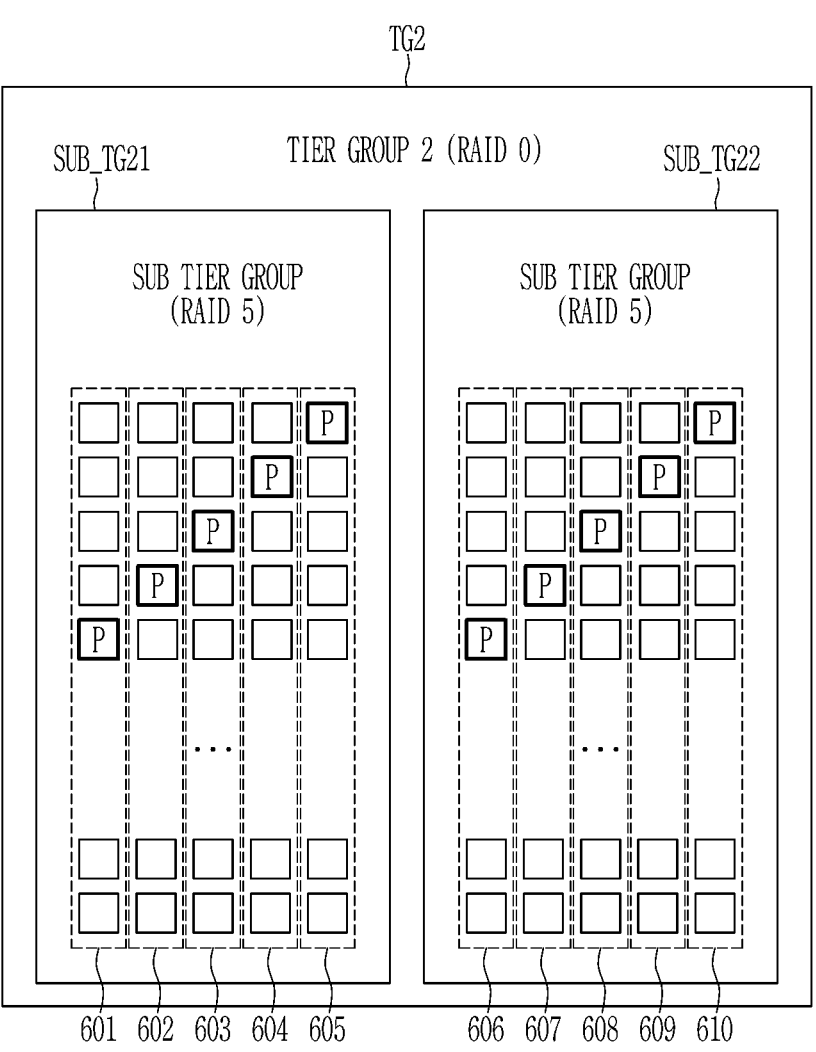
FIG. 6 is a diagram showing one tier group of memories in a CXL device according to some embodiments.

FIG. 5 is a flowchart showing a method of storing data in a memory according to some embodiments. FIG. 6 is a diagram showing one tier group of memories in a CXL device according to some embodiments.

Referring to FIG. 5, the CXL controller 300 may receive data and tiering information of the data (S501).

The tiering information may be information that is used to determine in which tier group data is included among a plurality of tier groups in the CXL device 200.

The CXL controller 300 may calculate a parity of data according to the set RAID structure (S503).

The CXL controller 300 may store the received data and the calculated parity in a corresponding memory (S505).

When data is received, the CXL controller 300 may store the data in a plurality of memories in a tier group corresponding to the tiering information of the data. Specifically, the CXL controller 300 may update existing parity while updating existing data stored in a plurality of memories in a tier group with newly received data, according to a RAID structure of a corresponding tier group. For example, the CXL controller 300 may update the parity by performing an XOR operation on the existing data, the new data, and the existing parity. In some embodiments, the CXL controller 300 may stripe the data by using a plurality of chips and may write a parity bit to an additional chip.

As shown in FIG. 6, the second tier group TG2 may include a plurality of sub-tier groups SUB_TG21 and SUB_TG22. The first sub-tier group SUB_TG21 may include a plurality of memories 601, 602, 603, 604 and 605. The second sub-tier group SUB_TG22 may include a plurality of memories 606, 607, 608, 609 and 610.

Each of the plurality of memories 601 to 610 may include a memory cell including a parity bit (P). In FIG. 6, for better understanding and ease of description, memory cells storing respective parity bits P of the plurality of memories 601 to 610 are shown as being positioned in an oblique direction across the plurality of memories 601 to 610. However, the memory cells storing the parity bits (P) may be located at any locations in the memories.

In some embodiments, when an error occurs in data in the CXL device 200, the CXL controller 300 may recover the data of the CXL device 200 by using the updated parity. The CXL controller 300 may recover erroneous data by using an ECC algorithm.

Figure 7:
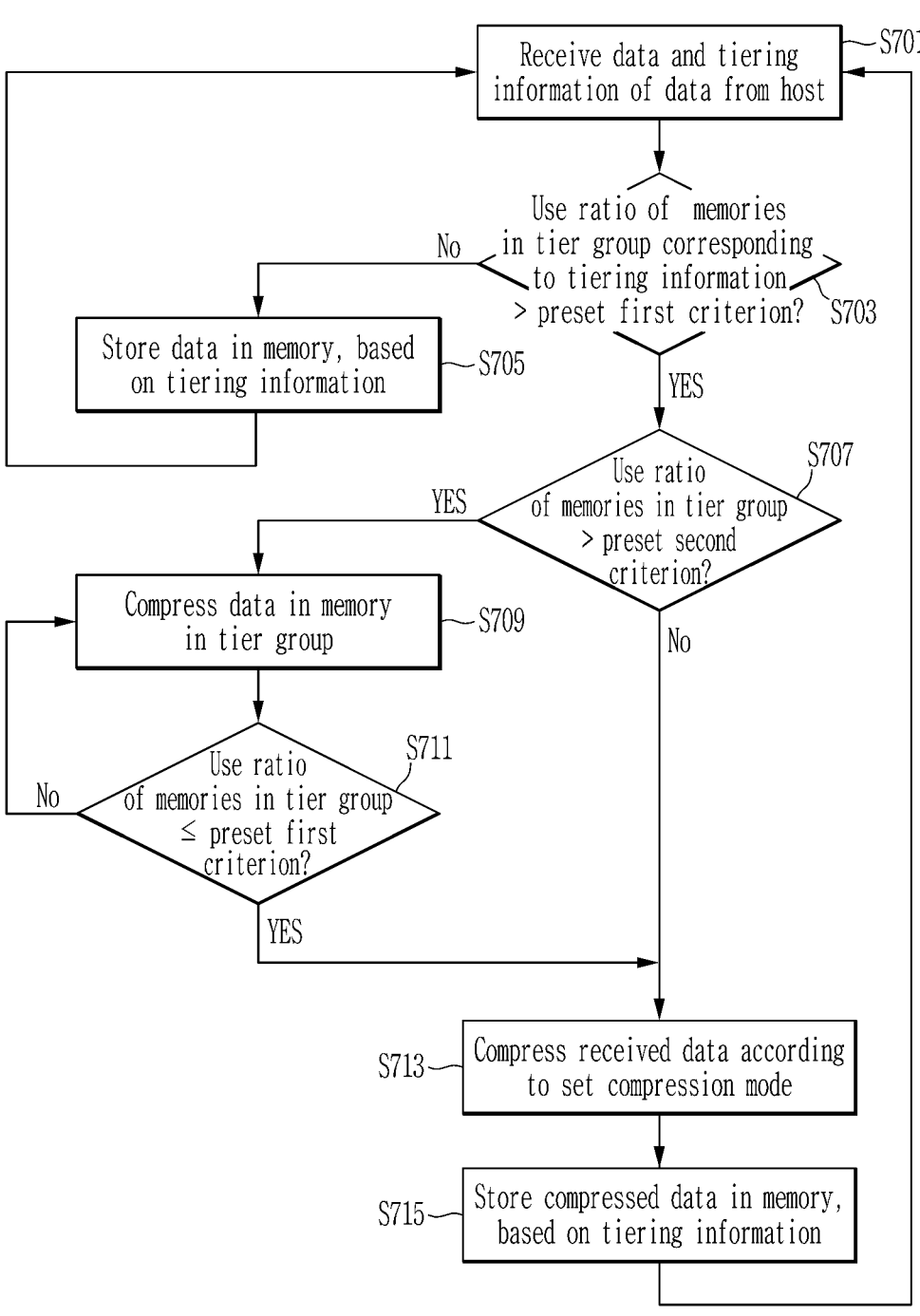
FIG. 7 is a flowchart showing a method of storing data in a memory according to some embodiments.

FIG. 7 is a flowchart showing a method of storing data in a memory according to some embodiments.

First, the CXL controller 300 may receive data and data tiering information from the host (S701).

In some embodiments, the data may be warm data. In this case, the tiering information may be set as an upper tier information.

The CXL controller 300 may determine whether a use ratio of the memories in the tier group corresponding to the tiering information exceeds a preset first criterion (S703).

For example, the CXL controller 300 may determine whether a ratio of memories storing data with respect to a plurality of memories included in one tier group exceeds a first criterion. Referring to FIGS. 4 and 7, when the CXL controller 300 receives warm data, the CXL controller 300 may detect a memory being used among the plurality of memories 400*a*, 400*b*, 400*c* and 400*d* included in the first tier group TG1 that is an upper tier group. If only two memories 400*a* and 400*b* among the plurality of memories 400*a*, 400*b*, 400*c* and 400*d* store data, the CXL controller 300 may detect that the use ratio is 50%. In some embodiments, the first criterion may be set different for each tier group or the same for each tier group.

If it is determined that the use ratio of the memories in the tier group corresponding to the tiering information does not exceed the preset first criterion, the CXL controller 300 may store the data in the memory, based on the tiering information (S705).

Specifically, the CXL controller 300 may store the data in a memory in the tier group corresponding to the tiering information. As described above, the CXL controller 300 may calculate parity bits, based on the RAID structure of the tier group, and may store the calculated parity bits together with the received data in a memory.

If it is determined that the use ratio of the memories in the tier group corresponding to the tiering information exceeds the preset first criterion, it may be determined whether the use ratio of the memories in the tier group exceeds a preset second criterion (S707). In some embodiments, if it is determined that the use ratio of the memories in the tier group corresponding to the tiering information exceeds the preset first criterion, the CXL controller 300 may compress the data received from the host.

Here, the preset second criterion may be greater than the preset first criterion.

If it is determined that the use ratio of the memories in the tier group exceeds the preset second criterion, the CXL controller 300 may compress the data in the memory in the tier group (S709).

In some embodiments, the CXL controller 300 may compress existing data in the tier group, replace the stored existing data with the compressed existing data, and store the compressed data. In some embodiments, the CXL controller 300 may read data stored in the memory in the tier group and temporarily store the same in the buffer memory (e.g., 313 in FIG. 2), and the compressor (e.g., 311 in FIG. 2) may compress the data in the buffer memory 313 and again store the same in the memory. In some embodiments, the CXL controller 300 may temporarily store the received data in the buffer memory 313 and compress the data in the buffer memory 313 when the CXL controller 300 does not perform a specific operation.

Thereafter, the CXL controller 300 may determine whether the use ratio of the memories in the tier group exceeds the preset second criterion (S711).

If it is determined that the use ratio of the memories exceeds the preset second criterion, the CXL controller 300 may compress the data in the memory again (S709).

Specifically, the CXL controller 300 may compress the data in the memories in the tier group until the use ratio of the memories in the tier group becomes equal to or less than the preset second criterion.

If it is determined that the use ratio of the memories in the tier group is equal to or less than the preset second criterion, the CXL controller 300 may compress the received data according to a set compression mode (S713).

In some embodiments, the CXL controller 300 may compress the received data by using the LZO method.

The CXL controller 300 may store the compressed data in the memory, based on the tiering information (S715).

Similarly, to step S705, the CXL controller 300 may store the data in the memory in the tier group corresponding to the tiering information. As described above, the CXL controller 300 may calculate parity bits, based on the RAID structure of the tier group, and may store the calculated parity bits together with the received data in a memory.

Thereafter, the CXL controller 300 performs step S701 again.

Figure 8:
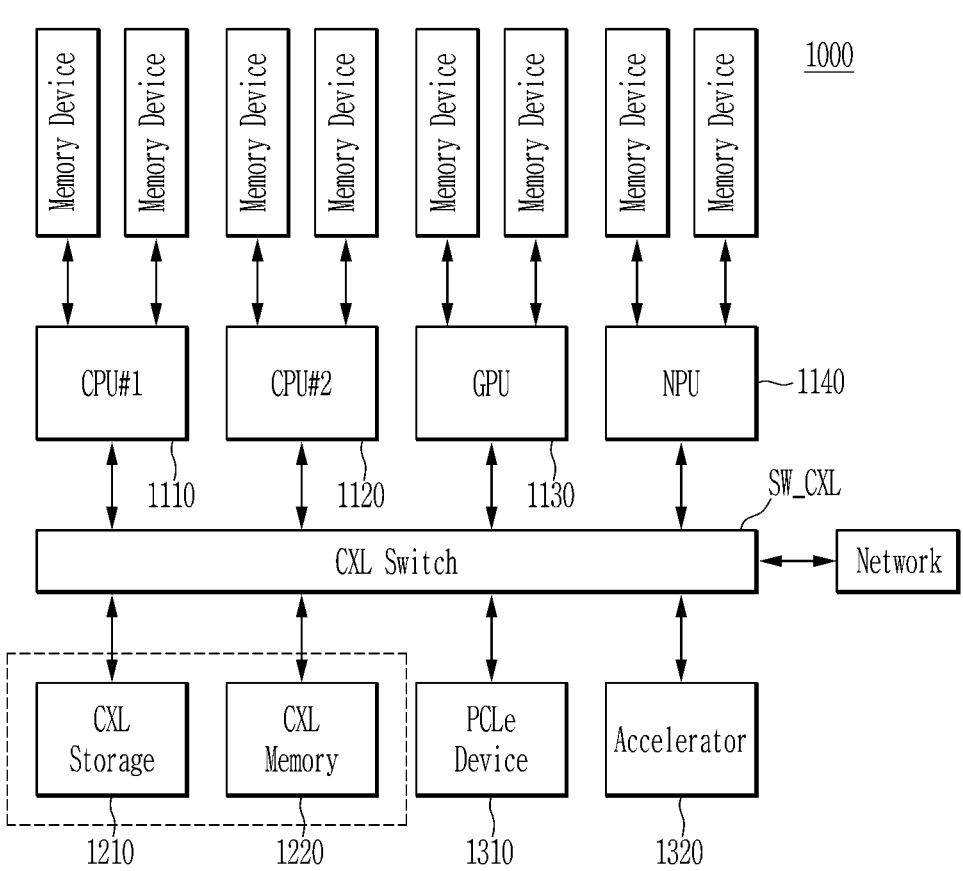
FIG. 8 is a block diagram showing a computer system according to some embodiments.

FIG. 8 is a block diagram showing a computer system according to some embodiments. For better understanding and ease of description, detailed descriptions of the constituent elements described above are omitted. Referring to FIG. 8, a computer system 1000 may include a first CPU 1110, a second CPU 1120, a GPU 1130, an NPU 1140, a CXL switch SW_CXL, a CXL storage 1210, a CXL memory 1220, a PCIe device 1310, and an accelerator 1320.

The first CPU 1110, the second CPU 1120, the GPU 1130, the NPU 1140, the CXL storage 1210, the CXL memory 1220, the PCIe device 1310, and the accelerator 1320 can be commonly connected to the CXL switch SW_CXL, and may be configured to communicate with each other via the CXL switch SW_CXL, respectively.

In some embodiments, each of the first CPU 1110, the second CPU 1120, the GPU 1130, and the NPU 1140 may be the host described with reference to FIGS. 1 to 7 (e.g., the host 100), and may be directly connected to individual memory devices.

In some embodiments, the CXL memory 1220 may be the CXL device described with reference to FIGS. 1 to 7 (e.g., the CXL device 200).

In some embodiments, the CXL switch SW_CXL may be connected to the PCIe device 1310 or accelerator 1320 and configured to support various functions, and the PCIe device 1310 or accelerator 1320 may be configured to communicate with each of the first CPU 1110, the second CPU 1120, the GPU 1130, and the NPU 1140 via the CXL switch SW_CXL, or to access a storage space STR including the CXL storage 1210 and the CXL memory 1220.

In some embodiments, the CXL switch SW_CXL may be connected to an external network or Fabric, and may be configured to communicate with an external server via the external network or Fabric.

The CXL device according to some embodiments may be configured to be able to perform adaptive management by changing a RAID structure in a software manner when a memory is out of order or reliability thereof is lowered (i.e., grade is lowered) due to the use for a long time. That is, the CXL device according to some embodiments can provide high data input/output speed and high reliability by changing a plurality of memory management logics (e.g., RAID structures or tier groups) to respond to a change in memory reliability.

A CXL device according to some embodiments may provide efficient management of a plurality of memories by using garbage collection. Garbage collection refers to a technology of securing empty blocks in which data can be stored by collecting and programming data scattered and stored in source blocks into some target blocks and erasing the source blocks. For example, since the CXL device according to some embodiments classifies each grade of a plurality of memories, the CXL device can collect and program data in a high-grade memory and can delete data stored in a low-grade memory.

As used herein, the terms "comprises", "comprising", "includes", "including", "has", "having" and any other variations thereof specify the presence of the stated features, integers, steps, operations, elements, and/or components, but do not preclude the presence or addition of one or more other features, integers, steps, operations, elements, components, and/or groups thereof.

Although the embodiments of the present invention have been described in detail, the scope of the present invention is not limited thereto, and various modifications and improvements made by one skilled in the art, by using concepts of the present invention defined in the following claims, also fall within the scope of the present invention.

While this invention has been described in connection with example embodiments thereof, it is to be understood that the invention is not limited to the disclosed embodiments. On the contrary, it is intended to cover various modifications and equivalent arrangements included within the scope of the appended claims.

What is claimed is:

1. A CXL device for managing storage of data in at least one of a plurality of memories, the CXL device comprising:
   the plurality of memories;
   a memory management unit configured to arrange the plurality of memories for storage of data at least in part by:
      configuring a plurality of tier groups among which the plurality of memories are classified and included;
      for each memory of the plurality of memories:
         obtaining metadata associated with the memory, wherein the metadata comprises information indicative of a determined remaining lifetime of the memory;
         determining the determined remaining lifetime of the memory based on an operating time, a number of received commands, a warranty period and/or a use period of the respective memory;
         determining a grade of the memory selected from a plurality of grades, wherein the determining the grade of the memory is configured such that:
            a first grade of the plurality of grades is assigned to a memory having metadata indicating a first determined remaining lifetime; and
            a second grade of the plurality of grades is assigned to a memory having metadata indicating a second determined remaining lifetime that is less than the first determined remaining lifetime;
         determining a tier group of the plurality of tier groups, to which the memory belongs according to the determined grade of the memory; and
         setting a RAID structure for the plurality of tier groups based on grades of memories included in each tier group;
   a memory processing unit configured to facilitate the storage of data at least in part by:
      determining a tier group of the plurality of tier groups in which to store the data based on tiering information of the data;
      selecting a memory of the plurality of memories included in the determined tier group in which to store the data; and
      storing the data in the selected memory,
   retrieving the stored data from the selected memory.

2. The CXL device of claim 1, wherein the memory management unit is further configured to:
   determine the tier group to which the memory belongs as a first tier group of the at least one tier group when the grade is the first grade; and
   determine the tier group to which the memory belongs as a second tier group of the at least one tier group when the grade is the second grade having a reliability level lower than the first grade.

3. The CXL device of claim 2, wherein the memory management unit is further configured to receive the first data including tiering information that is set as first tier information and the second data including tiering information that is set as second tier information, wherein the memory processing unit is further configured to:
   store the first data in one of the plurality of memories included in the first tier group, based on the first tier information; and store the second data in one of the plurality of memories included in the second tier group, based on the second tier information, and wherein the first tier information is generated based on a frequency of use and an input/output speed of the first data, and the second tier information is generated based on a frequency of use and an input/output speed of the second data.

4. The CXL device of claim 3, further comprising a compressor configured to compress the first data by using a first compression method according to a speed-focused compression algorithm when a use ratio of ones of the plurality of memories included in the first tier group exceeds a first criterion, wherein the memory processing unit is further configured to store the first data that was compressed in one of the plurality of memories included in the first tier group.

5. The CXL device of claim 4, wherein the compressor is further configured to compress existing data stored in one of the plurality of memories included in the first tier group when the use ratio of the ones of the plurality of memories included in the first tier group exceeds a second criterion higher than the first criterion, and wherein the memory processing unit is further configured to replace the existing data with the existing data that was compressed and store the existing data that was compressed in one of the plurality of memories included in the first tier group.

6. The CXL device of claim 4, wherein the compressor is further configured to compress the second data by using a second compression method according to a compression rate-focused compression algorithm when a use ratio of ones of the plurality of memories included in the second tier group exceeds a second criterion, and wherein the memory processing unit is further configured to store the second data that was compressed in one of the plurality of memories included in the second tier group.

7. The CXL device of claim 2, wherein the first tier group comprises a first quantity of ones of the plurality of memories having the first grade and a second quantity of ones of the plurality of memories having the second grade, wherein the second tier group comprises a third quantity of ones of the plurality of memories having the first grade and a fourth quantity of ones of the plurality of memories having the second grade, and wherein the first quantity is equal to or greater than the third quantity, and the second quantity is equal to or less than the fourth quantity.

8. The CXL device of claim 2, wherein the memory management unit is configured to set a RAID structure of each of the first tier group and the second tier group, and wherein the memory processing unit is configured to calculate a parity bit of the data according to the RAID structure.

9. The CXL device of claim 8, wherein the first tier group has a RAID 0 structure and the second tier group has a nested RAID structure.

10. An operation method of a CXL device for managing storage of data in at least one of a plurality of memories of the CXL device, the operation method comprising:

arranging the plurality of memories of the CXL device for storage of data at least in part by:

configuring a plurality of tier groups among which the plurality of memories are classified and included;

for each memory of the plurality of memories:

obtaining metadata associated with the memory, wherein the metadata comprises information indicative of a determined remaining lifetime of the memory;

determining the determined remaining lifetime of the memory based on an operating time, a number of received commands, a warranty period and/or a use period of the respective memory;

determining a memory grade of the memory wherein the memory grade is selected from a plurality of grades and the determining the memory grade is configured such that:

a first grade of the plurality of grades is assigned to a memory having metadata indicating a first determined remaining lifetime; and a second grade of the plurality of grades is assigned to a memory having metadata indicating a second determined remaining lifetime that is less than the first determined remaining lifetime; and determining a tier group of the plurality of tier groups, to which the memory belongs, according to the determined memory grade;

setting a RAID structure of the determined tier group;

determining a tier group of the plurality of tier groups in which to store the data;

selecting a memory of the plurality of memories included in the determined tier group in which to store the data;

storing the data in the selected memory; and retrieving the stored data from the selected memory.

11. The operation method of claim 10, further comprising:

receiving the data and tiering information of the data;

calculating a parity of the data, according to the RAID structure of the at least one tier group, based on the tiering information; and storing the parity in one of the plurality of memories included in the at least one tier group.

12. The operation method of claim 11, further comprising:

wherein determining the tier group in which to store the data comprises determining a first tier group, in which the data is stored, of the at least one tier group, based on the tiering information; determining whether a memory use ratio of the first tier group exceeds a preset first criterion;

compressing the data when the memory use ratio exceeds the first criterion; and storing the data comprises storing the data that was compressed in one of the plurality of memories included in the first tier group.

13. The operation method of claim 12, further comprising:

determining whether the memory use ratio of the first tier group exceeds a preset second criterion higher than the first criterion; and compressing existing data stored in one of the plurality of memories included in the first tier group when the memory use ratio exceeds the second criterion.

14. A computer system for managing storage of data in at least one of a plurality of memories of a CXL device, the computer system comprising:

a host configured to:

output first data including tiering information that is set as first tier information requiring a first number of input/output times; and output second data including tiering information that is set as second tier information requiring a second number of input/output times smaller than the first number of input/output times; and the CXL device, wherein the CXL device comprises a plurality of memories and is configured to:

arrange the plurality of memories of the CXL device for storage of data at least in part by:

determining a grade for each memory of the plurality of memories based on metadata indicating at least one of an operating time, a number of received commands, a warranty period, or a use period of the memory;

configuring a plurality of tier groups among which the plurality of memories are classified and included, the plurality of tier groups comprising a first tier group and a second tier group by classifying the plurality of memories based on the determined grade;

setting a RAID structure of each of the first tier group and the second tier group;

facilitate storage of data in at least one of the plurality of memories at least in part by:

storing the first data in one of the plurality of memories included in the first tier group, based on the first tier information; and storing the second data in one of the plurality of memories included in the second tier group, based on the second tier information.

15. The computer system of claim 14, wherein the CXL device is further configured to:

determine a grade of a first memory of the plurality of memories, based on metadata of the first memory;

determine a tier group, to which the first memory belongs, as the first tier group when the grade is a first grade; and determine the tier group, to which the first memory belongs, as the second tier group when the grade is a second grade having a reliability level lower than the first grade.

16. The computer system of claim 15, wherein the first tier group has a RAID 0 structure and the second tier group has a nested RAID structure.

17. The computer system of claim 15, further comprising:

a compressor configured to compress the first data by using a first compression method according to a speed-focused compression algorithm when a use ratio of ones of the plurality of memories included in the first tier group exceeds a first criterion; and a memory processing unit configured to store the first data that was compressed in one of the plurality of memories included in the first tier group.

18. The computer system of claim 17, wherein the compressor is further configured to compress existing data stored in one of the plurality of memories included in the first tier group when the use ratio of ones of the plurality of memories included in the first tier group exceeds a second criterion higher than the first criterion, and wherein the memory processing unit is further configured to replace the existing data with the existing data that was compressed and store the existing data that was compressed in one of the plurality of memories included in the first tier group.

19. The computer system of claim 18, wherein the compressor is further configured to compress the second data by using a second compression method according to a compression rate-focused compression algorithm when a use ratio of ones of the plurality of memories included in the second tier group exceeds a second criterion, and wherein the memory processing unit is further configured to store the second data that was compressed in one of the plurality of memories included in the second tier group.

20. The computer system of claim 14, wherein the CXL device is further configured to:

calculate a parity bit of the first data according to the RAID structure of the first tier group;

calculate a parity bit of the second data according to the RAID structure of the second tier group; store the first data and the parity bit of the first data in at least one of the plurality of memories included in the first tier group; and store the second data and the parity bit of the second data in at least one of the plurality of memories included in the second tier group.

* * * * *